(12) United States Patent
Nikander et al.

(10) Patent No.: US 8,320,309 B2
(45) Date of Patent: Nov. 27, 2012

(54) IP MOBILITY WITHIN A COMMUNICATION SYSTEM

(75) Inventors: Pekka Nikander, Jorvas (FI); Henrik Levkowetz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 12/298,109

(22) PCT Filed: Apr. 25, 2006

(86) PCT No.: PCT/EP2006/061819
§ 371 (c)(1),
(2), (4) Date: Apr. 14, 2010

(87) PCT Pub. No.: WO2007/121787
PCT Pub. Date: Nov. 1, 2007

(65) Prior Publication Data
US 2011/0299477 A1 Dec. 8, 2011

(51) Int. Cl.
*H04W 4/00* (2009.01)
(52) U.S. Cl. ....................................... 370/329
(58) Field of Classification Search ........................ None
See application file for complete search history.

(56) References Cited

U.S. PATENT DOCUMENTS

| | | | |
|---|---|---|---|
| 2003/0112794 A1* | 6/2003 | Manohar | 370/352 |
| 2004/0013116 A1* | 1/2004 | Greis et al. | 370/392 |
| 2004/0264435 A1 | 12/2004 | Chari et al. | |
| 2005/0013280 A1 | 1/2005 | Buddhikot et al. | |
| 2006/0062203 A1* | 3/2006 | Satapati | 370/352 |
| 2008/0271132 A1* | 10/2008 | Jokela et al. | 726/10 |
| 2010/0008507 A1* | 1/2010 | Galante et al. | 380/278 |

OTHER PUBLICATIONS

Savola P et al; "A Survey of IPv6 Site Multihoming Proposals" Telecommunications, 2005, Contel 2005, Proceedings of the 8th International Conference on Zagreb, Croatia Jun. 15-17, 2005, Piscataway, NJ, USA, IEEE, Jun. 15, 2005, pp. 41-48, XP010810282 ISBN: 953-184-081-4 The whole document.
Nordmark Sun Microsystems E: "Extended Shim6 Design for ID/loc split and Traffic Engineering" IETF Standard-Working-Draft, Internet Engineering Task Force, IETF. CH. Feb. 26, 2006, XP015044470 ISSN: 0000-0004 p. 3-15.

* cited by examiner

*Primary Examiner* — John Blanton

(57) ABSTRACT

A method and gateway node for routing IP traffic to and from a mobile terminal able to connect to the Internet via two or more gateway nodes. A multi-addressing multi-homing protocol is implemented at each gateway node on behalf of the mobile terminal. The gateway nodes share protocol state information to enable gateway nodes to update state information at the corresponding node when the mobile terminal changes gateway nodes.

11 Claims, 3 Drawing Sheets

IP MOBILITY WITHIN A COMMUNICATION SYSTEM

FIELD OF THE INVENTION

The present invention relates to IP mobility within a communication system, and more particularly to a method and apparatus for facilitating local breakout of Internet Protocol traffic within a cellular communication system.

BACKGROUND TO THE INVENTION

So-called third generation cellular networks such as the Third Generation Protocol Partnership (3GPP) specified 3G networks are now in place in many locations. In order to continue to advance the quality and range of services available to users, work is ongoing to develop the existing specifications further. In respect of the 3G network architecture, 3GPP is planning a new core architecture referred to as the System Architecture Evolution (SAE). Of course, it is important that certain key constructs of the existing 3G core architecture are retained in future developments.

User and terminal mobility is key to the success of previous and current generation cellular networks. However, providing mobility for data (IP) traffic has proved particularly challenging. According to the current 3G core network architecture, a user's home network remains responsible for routing IP traffic to and from a user terminal, regardless of whether the user is attached directly to the home network (via some access network) or is attached via a visited (i.e. third party operated) network. This means, for example, that when a user wishes to send and receive Internet data whilst registered with a visited network, all traffic is routed between the user's terminal and a corresponding node (e.g. a web server) via both the visited and home networks. Typically, routing is handled by a Forwarding Agent (FA) located at a Gateway GPRS Support Node (GGSN) of the home network. Where a user is attached to a different GGSN, within the same or a different network, IP traffic will always be routed both through that other GGSN and the home GGSN at which the FA resides. This is desirable from an operator's point of view as it allows the operator to maintain access control and apply appropriate charging tariffs.

It is accepted however that routing all data traffic via the home network may be inefficient, particularly when a user is attached to a visited network. In such cases, allowing for "local breakout" (also referred to as "route optimisation") of IP traffic could both shorten the end-to-end route and reduce the load on relatively expensive IP backbones (which inherently provide a high Quality of Service). Implementing local breakout relies upon so-called "multi-homing", where a user can be reached—in an IP sense—at one of a number of locations (IP addresses), possibly via different access networks, and possibly simultaneously.

One multi-homing based mobility solution is that referred to as "Site Multihoming by IPv6 Intermediation" (SHIM6), currently being developed by the Internet Engineering Task Force (IETF). An object of SHIM6 is to provide an "IPv6-based site multi-homing solution that inserts a new sub-layer (shim) into the IP stack of end-system hosts" and that "will enable hosts on multi-homed sites to use a set of provider-assigned IP address prefixes and switch between them without upsetting transport protocols or applications". SHIM6 provides a mechanism whereby a Corresponding Node (CN) can route traffic at the application layer to a Mobile Node (MN) using a fixed (at least in the medium term) IP address/port number, despite changes to the IP address/port number caused by, for example, movement of the MN. Changes to the IP address/port number are handled by an address translation mechanism at the SHIM6 layer. In SHIM6, the fixed IP address/port number is referred to as the "Upper Layer Identifier" (ULID) whilst the actual IP header addresses are referred to as "Locators" (L). Security in SHIM6 may be implemented, for example, by making use of cryptographically generated IP addresses, where only the true owner of an IP address can prove ownership of that address (see for example WO02076060).

A variant of SHIM6 is that referred to as the "Host Identity Protocol" (HIP). HIP introduces the concept of a Host Identity (HI) that is owned by a user and for which the user can prove ownership. The HI is used as the user's address by the application layers, and is mapped (or rather a Host Identity Tag derived from the HI is mapped) to a current location (IP address) by a HIP layer. By default, both SHIM6 and HIP implement multi-homing at the user terminal. That is to say that an individual user can control the selection of the IP address that he currently prefers to receive traffic at. This conflicts with the desirability, from an operator point of view, to prevent local breakout in order to retain control within the home network (e.g. routing all IP traffic through a FA at the home network's GGSN).

The IETF protocol known as Mobile IP provides to some extent a solution to the problem of allowing an operator to control local breakout policy. However, breakout is available only when the fixed IP address (ULID) allocated to a mobile terminal changes. In the case of a 3GPP network, this would probably only happen when a mobile terminal roams out of a home network into a visited network, e.g. the terminal moves across a national boundary.

SUMMARY OF THE INVENTION

It would be desirable to implement in the SAE of 3G a core network architecture that provides a compromise solution, i.e. allowing for mobility and multi-homing under operator control.

According to a first aspect of the present invention there is provided a method of routing IP traffic to and from a mobile terminal able to connect to the Internet via two or more gateway nodes, the method comprising:
  allocating to the mobile terminal a terminal identity;
  for each gateway node, allocating to the mobile terminal an IP address;
  providing, at each gateway node and at a corresponding node or nodes or at functional equivalents of the corresponding node(s), state information mapping the IP address corresponding to the gateway, to said mobile terminal identity, and performing address translations at the gateway node and the corresponding node(s) or functional equivalent(s) using the state information; and
  sharing state information between gateway nodes to allow gateway nodes to update state information at the corresponding node(s) or functional equivalent(s) when the mobile terminal changes gateway node.

The term "functional equivalent" as used here covers the possibility that a corresponding node is itself located behind a gateway node (or nodes) which maintains state information on behalf of the corresponding node.

The IP mobility mechanism is effectively transparent to the mobile terminal, as the mobile terminal continues to use the terminal identity as its IP address, regardless of changes to the actual IP address use to route traffic between the gateway nodes and a corresponding node. Address translation is handled on behalf of the terminal by the gateway node. By sharing state information between gateway nodes, a new gateway node is able to seamlessly continue a SHIM6 "session" with a corresponding node, and update the SHIM6 state at the corresponding node with the new IP address allocated to the mobile terminal.

The mobile terminal may itself act as a gateway node, sharing state information with the other, true, gateway nodes.

In the case of IPv4 where the SHIM6 state may be associated with a v4 NAT state, a port number may be allocated to the mobile terminal in addition to the IP address at which the terminal is reachable. Said state information maps the IP address and the port number to the mobile terminal identity. In the IPv6 case, no port number need be allocated to the mobile terminal.

It will be understood that said IP address (and optionally port number) that is allocated to a mobile terminal by a gateway node is used to route traffic from a corresponding node to that gateway node.

The terminal identity may be an IP address and optionally a port number, for example as allocated to the mobile terminal by an initial gateway node. For this initial gateway node, said mapping is a mapping of the IP address (and optionally port number) to itself. Alternatively, the identity may be a permanent identity of the mobile terminal or a mobile terminal user.

Said step of sharing state information between gateway nodes preferably comprises sending current state information from a gateway node currently used to access the Internet, to a new gateway node, whereupon the new gateway node negotiates with a corresponding node or its functional equivalent to update the current state information with the new IP address (and port number) of the mobile terminal. An originating gateway node is informed of changes to state information by a new gateway node.

An embodiment of the present information uses the SHIM6 multi-homing protocol, with a SHIM6 protocol layer being implemented at the corresponding node and the gateway nodes. An alternative embodiment implements the HIP protocol at these nodes. Optionally, HIP protocol may additionally be implemented at the mobile node, where the mobile node explicitly delegates to the gateway node the right to extend the addressing state to other gateway nodes.

The invention is applicable in particular to a system in which the gateway nodes are within a 3G core network or an access network operated by a 3G core network operator. For example, the gateway nodes may comprise one or more of a GGSN, ACGW, or a Node B.

According to a second aspect of the present invention there is provided a method of operating a gateway node for routing IP traffic between a corresponding node and a mobile terminal to which a mobile terminal identity is allocated, the method comprising:

allocating to the mobile terminal an IP address of the gateway node;

maintaining at the gateway node, state information mapping said IP address to said mobile terminal identity, and performing address translations at the gateway node using the state information; and sharing state information with one or more other gateway nodes to allow gateway nodes to update state information at a corresponding node or its functional equivalent, when the mobile terminal changes gateway node.

It will be appreciated that an IP address of the gateway node may be allocated to the mobile terminal by the gateway node itself, or by some other node. The IP address may alternatively be allocated by the mobile terminal itself.

According to a third aspect of the present invention there is provided a gateway node for routing IP traffic between a corresponding node and a mobile terminal to which a mobile terminal identity is allocated, the gateway node comprising:

means for allocating to the mobile terminal an IP address of the gateway node;

a memory for maintaining state information mapping said IP address to said mobile terminal identity;

means for performing address translations using the state information; and communication means for sharing state information with one or more other gateway nodes to allow gateway nodes to update state information at the corresponding node or its functional equivalent, when the mobile terminal changes gateway node.

According to a fourth aspect of the present invention there is provided a method of routing IP traffic to and from a mobile terminal able to connect to the Internet via two or more gateway nodes, the method comprising:

implementing a multi-addressing multi-homing protocol at each gateway node on behalf of the mobile terminal; and sharing protocol state information between gateway nodes to allow gateway nodes to update state information at the corresponding node or its functional equivalent, when the mobile terminal changes gateway node.

DETAILED DESCRIPTION

When a mobile terminal has a dynamic set of multiple interchangeable IP addresses, the 3GPP network can instruct corresponding nodes in the Internet to use any of the registered addresses as the current address for the terminal. In practice, this allows the terminal to always be reached at the topologically best address, optimising the use of network resources. However, rather than delegating responsibility for the selection of an IP address to the mobile terminal, it is proposed here to implement the multi-address multi-homing functionality within the 3GPP core network. There is no longer a requirement for a Forwarding Agent (FA) within the home network. The solution provides better breakout control for the terminal's home network operator, as well as simplifying the implementation of the mobile terminal. The solution may be based upon SHIM6, HIP, or MONAMI6 specifications. Of these various options, SHIM6 is currently preferred for the present application due to its architecture and backwards compatibility. [Whilst this approach can currently be applied only to IPv6 traffic, possible future designs of SHIM6 may also make it applicable to IPv4.]

The approach presented here relies upon a SHIM6 "module" being implemented in each IP data path between the mobile terminal and any corresponding nodes (CNs) accessible over the Internet. However, it is important that the SHIM6 modules are implemented at nodes over which an operator (typically having a billing relationship with a user) has control, or at node whose operator is trusted by that billing operator. At least in certain architectures, these modules are located at the gateways between the 3GPP core network and the Internet. In the case of the current 3GPP architecture, the gateway would be a Gateway GPRS Support Node (GGSN) or an equivalent new gateway node for the SAE, referred to as the "Access and Core Gateway" (ACGW). In the following, the term ACGW is used to denote both modified GGSN nodes and new ACGW nodes.

Figure 1:
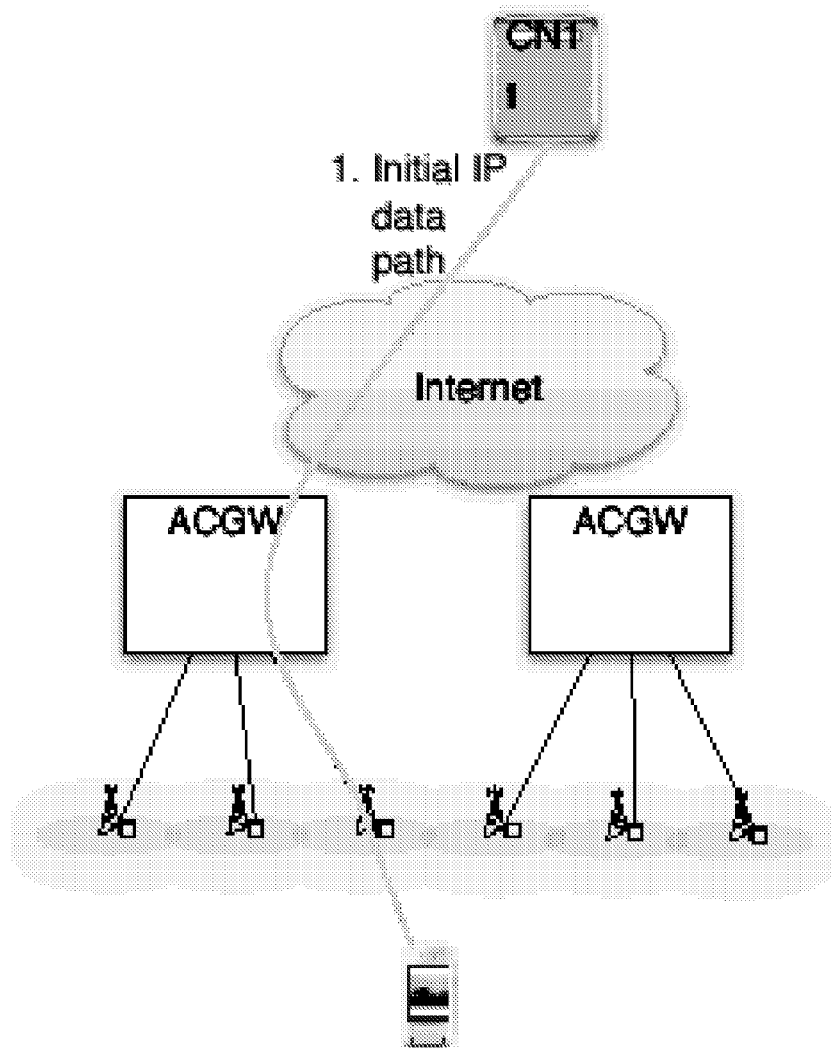
FIG. 1 illustrates schematically a 3G SAE network where a mobile terminal communicates with a corresponding node via a UTRAN access network.

FIG. 1 illustrates schematically a SHIM6 module located at an ACGW node disposed between the UMTS Radio Access Network (UTRAN) and the Internet. The mobile terminal (MT) is provided with an IP address by the ACGW. IP traffic is then routed between the MT (attached to the UTRAN) and a CN via the ACGW. In this "initial" situation, the data flow path can be considered relatively optimal. Data from the MT is passed through the access and core networks to the ACGW, which routes the packets to the Internet. Packets sent to the MT from the CN are routed in the reverse direction.

The ACGW and CN establish a SHIM6 state pertaining to the MT. This is achieved via a negotiation between the parties although, as yet, the details are not specified in SHIM6. This can happen either at the time when the MT first communicates with the CN or vice versa, or at any later time. [If HIP is used instead of SHIM6, as of today state setup must happen at the time of first communication and cannot happen afterwards. Of course, HIP may in the future be modified to allow delayed HIP state set up.] Following establishment of the SHIM6 state, the IP address allocated to the MT operates initially as both an Upper Layer Identifier (ULID) and a Locator (L) for the MT.

It will be appreciated that the SHIM6 state is not set up between the MT and the CN, as would be done according to the current IETF standards. This is made possible by a few architectural choices in the SAE proposal and the SHIM6 architecture:

The MT's IP address(es) are assigned by the ACGW via DHCP, or other means. That is, even in the case of IPv6, the ACGW is in control of the MT's IP addresses, not the MT itself (or at least the ACGW is in control of the address prefixes that the MT can use and knows what interface identifier(s) the MT is using).

SHIM6 address rewriting is designed to be transparent to the layers above. Hence, due to the addresses being managed by the ACGW, the ACGW can do SHIM6 address rewriting in a way that is fully transparent to the MT.

If the SHIM6 state setup fails due to the CN not supporting SHIM6, the system can fall back to a default state in which local breakout is prohibited and all traffic is routed through a single ACGW.

As currently specified, a SHIM6 state is designed to be implemented at a single host, i.e., within a single node and single operation system. It is proposed here to implement the SHIM 6 state in a distributed fashion among a number of consenting ACGWs, in such a way that the distribution is transparent to the other end of the SHIM6 association, the CN, i.e. so that the CN cannot tell the difference between a single ACGW being multiply connected to the Internet and several co-operating ACGWs being connected. This is achieved by introducing a new signaling and coordination protocol between the consenting ACGW nodes, allowing them to share multi-addressing state information for mobile terminals.

Figure 2:
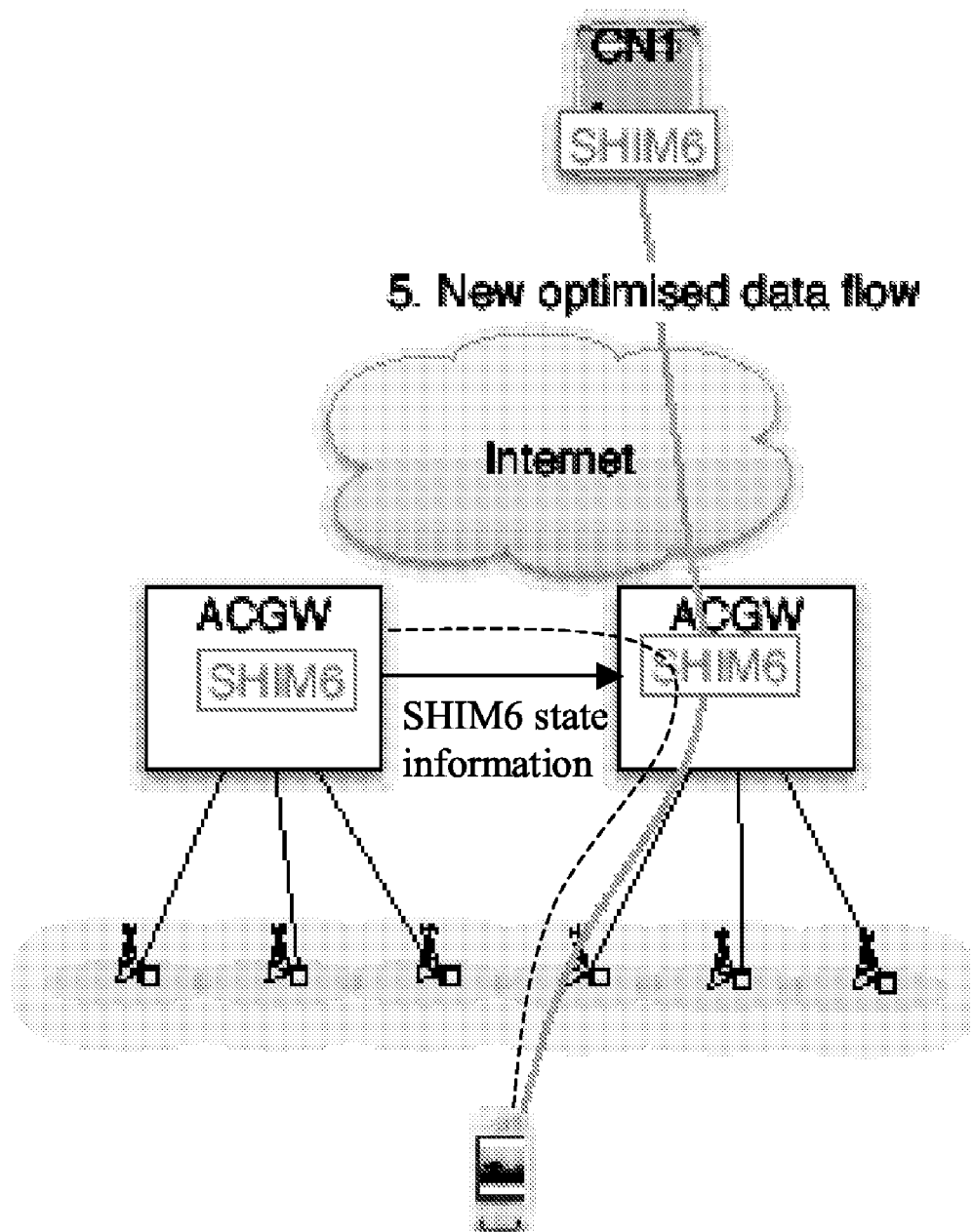
FIG. 2 illustrates schematically the network of FIG. 1, where the mobile terminal roams to a new access point, and the IP traffic route is optimised.

Consider the scenario where the MT of FIG. 1 roams to a new access network, so that it is served by a new ACGW as illustrated in FIG. 2. The new ACGW will allocate a new Locator, i.e. IP address and (optionally) port number, to the mobile terminal. The ULID remains unchanged. According to the current SAE proposals, if traffic continues to be routed through the initial ACGW, as illustrated by the dashed line in FIG. 2, the data flow path is no longer optimal from a topology point of view. Using a new interface between the old and the new ACGWs, the new ACGW obtains the state information for the ongoing session between the mobile terminal and the CN. The CN and the new ACGW can then perform address rewriting as specified in the SHIM6 specification to provide the new Locator to the CN. In the same or a subsequent step, the new ACGW informs the CN that the new Locator is the "preferred" Locator. This causes subsequent IP traffic to be routed directly to the new ACGW, bypassing the old ACGW, as illustrated by the solid line in FIG. 2. Address translation between the ULID and the new Locator is performed within the SHIM6 layer at the new ACGW. In the event that the new Locator becomes unavailable, the SHIM6 layer at the CN may fall back to using the old Locator.

At least the ACGW node that originally set up the SHIM6 state must be informed of state changes by subsequent ACGWs. This is because it is the original ACGW that "owns" the original IP address which continues to be used (as ULID for the MT) even when the traffic route changes. The original ACGW must know when that IP address can be released. Other, intermediate, ACGWs should also have their state information maintained, as Locators "owned" by these nodes may be used as fall back addresses by the CNs until such time as these Locators are removed from all CNs.

When SHIM6 is used as the multi-addressing multi-homing mechanism, the proposal presented here allows local breakout to be implemented in an opportunistic manner, as the need arises, without needing to complicate the initial communication between the mobile terminal and the corresponding nodes. If a corresponding node does not support SHIM6, the method can fall back to a basic mode of operation without local breakout.

Figure 3:
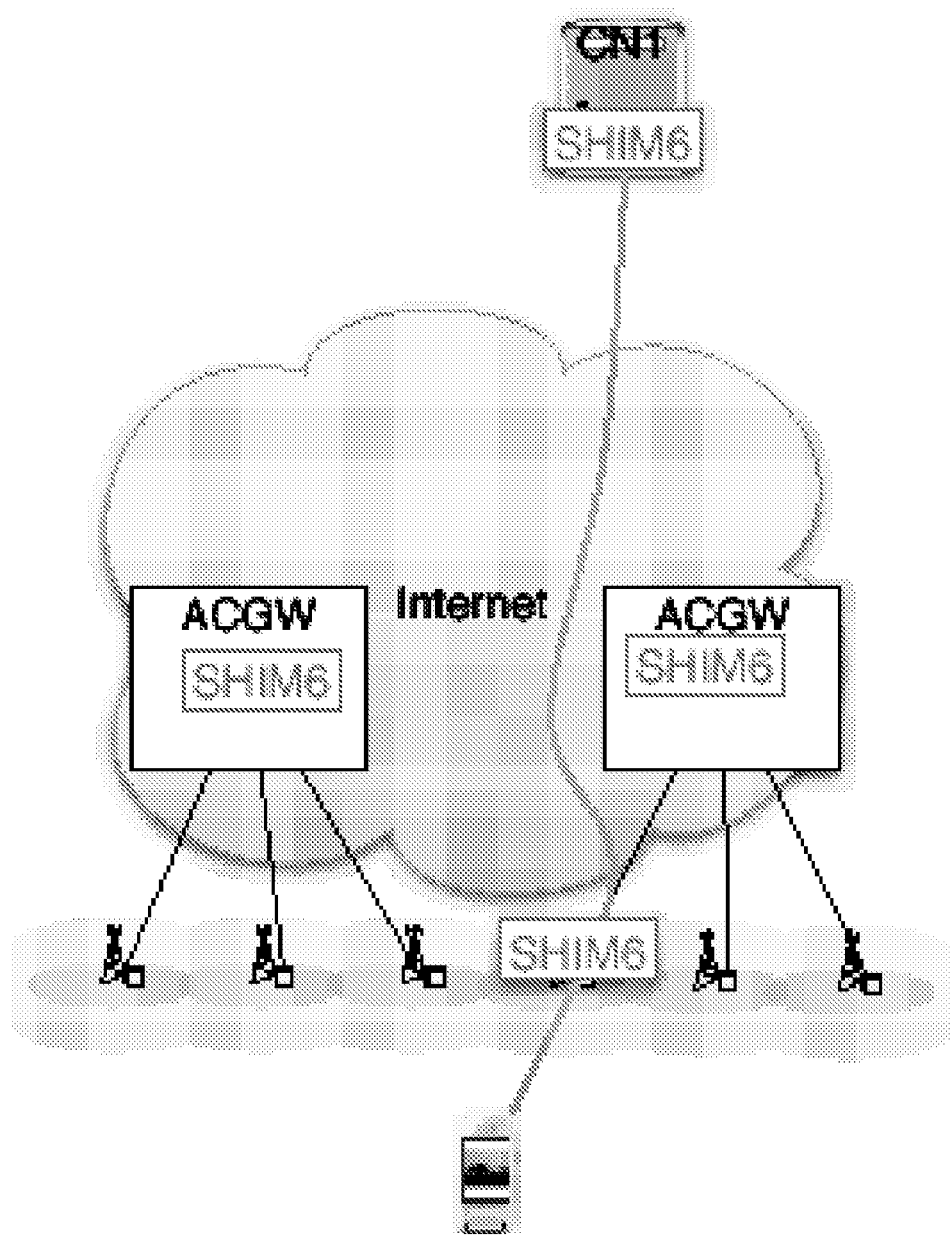
FIG. 3 illustrates schematically the network of FIG. 1, where local break out for the mobile terminal occurs at a Node B of the UTRAN access network.

Whilst the above embodiment has been concerned with installing the SHIM6 modules at the ACGW nodes (or GGSN nodes), it is of course possible to install the modules at other nodes which are under the control of the user's home network (or are otherwise trusted by the home network), and from which local breakout is possible. FIG. 3 illustrates the case where a SHIM6 module is installed at a Node B of a UTRAN access network. This SHIM module shares SHIM6 state information with one of the AGCW nodes.

It will be appreciated by the person of skill in the art that various modifications may be made to the above described embodiments without departing from the scope of the present invention.

The invention claimed is:

1. A method of routing Internet Protocol (IP) traffic to and from a mobile terminal able to connect to the Internet via two or more gateway nodes, the method comprising:
    allocating to the mobile terminal, a terminal identity;
    for each gateway node, allocating to the mobile terminal, a gateway node IP address for routing traffic from a corresponding node to the gateway node;
    providing, at each gateway node and at the corresponding node, state information mapping the allocated IP address of the gateway node to said mobile terminal identity;
    performing address translations at the gateway node and the corresponding node using the state information; and
    sharing state information between gateway nodes to allow gateway nodes to update state information at the corresponding node when the mobile terminal changes gateway nodes;

wherein the mobile terminal continues to utilize the terminal identity as its IP address while the IP address of the gateway node allocated to the mobile terminal is utilized to route traffic between the corresponding node and the gateway node.

2. The method according to claim 1, further comprising allocating for each gateway node, a port number, said state information mapping the allocated IP address and port number to the mobile terminal identity.

3. The method according to claim 1, wherein said mobile terminal identity is an IP address allocated to the mobile terminal by an initial gateway node.

4. The method according to claim 1, wherein said step of sharing state information between gateway nodes comprises sending current state information from a gateway node currently used to access the Internet, to another gateway node, whereupon one or more of the gateway nodes negotiates with the corresponding node to update the current state information with a new IP address of the mobile terminal.

5. The method according to claim 1, wherein said gateway nodes and a plurality of corresponding node nodes implement a multi-addressing multi-homing protocol to establish said state information and to perform said address translations.

6. The method according to claim 5, wherein said multi-addressing multi-homing protocol is SHIM6 or HIP.

7. The method according to claim 1, wherein said gateway nodes are within a 3G core network or an access network operated by a 3G core network operator.

8. The method according to claim 7, wherein the gateway nodes comprise one or more of a Gateway GPRS Support Node (GGSN), Serving GPRS Support Node (SGSN), Access and Core Gateway (ACGW), or a Node B.

9. A method of operating a gateway node for routing Internet Protocol (IP) traffic between a corresponding node and a mobile terminal to which a mobile terminal identity is allocated, the method comprising:
   allocating to the mobile terminal an IP address of the gateway node;
   maintaining at the gateway node, state information mapping said IP address to said mobile terminal identity;
   performing address translations at the gateway node using the state information; and
   sharing state information with one or more other gateway nodes to allow gateway nodes to update state information at the corresponding node, when the mobile terminal changes gateway nodes;
   wherein the mobile terminal continues to utilize the terminal identity as its IP address while the IP address of the gateway node allocated to the mobile terminal is utilized to route traffic between the corresponding node and the gateway node.

10. A gateway node for routing Internet Protocol (IP) traffic between a corresponding node and a mobile terminal to which a mobile terminal identity is allocated, the gateway node comprising:
   means for allocating to the mobile terminal an IP address of the gateway node;
   a non-transitory memory for maintaining state information mapping said IP address to said mobile terminal identity;
   means for performing address translations using the state information; and
   communication means for sharing state information with one or more other gateway nodes to allow gateway nodes to update state information at the corresponding node when the mobile terminal changes to a new gateway node;
   wherein the mobile terminal continues to utilize the terminal identity as its IP address while the IP address of the gateway node allocated to the mobile terminal is utilized to route traffic between the corresponding node and the gateway node.

11. A method of routing Internet Protocol (IP) traffic to and from a mobile terminal able to connect to the Internet via two or more gateway nodes, wherein the mobile terminal is allocated a mobile terminal identity for use as the terminal's IP address, the method comprising:
   implementing a multi-addressing multi-homing protocol at each gateway node on behalf of the mobile terminal; and
   sharing protocol state information between the gateway nodes to enable the gateway nodes to update state information at a corresponding node when the mobile terminal changes gateway nodes;
   wherein the mobile terminal continues to utilize the terminal identity as its IP address while the IP address of the gateway node allocated to the mobile terminal is utilized to route traffic between the corresponding node and the gateway node.

* * * * *

UNITED STATES PATENT AND TRADEMARK OFFICE
CERTIFICATE OF CORRECTION

PATENT NO. : 8,320,309 B2
APPLICATION NO. : 12/298109
DATED : November 27, 2012
INVENTOR(S) : Nikander et al.

Page 1 of 1

It is certified that error appears in the above-identified patent and that said Letters Patent is hereby corrected as shown below:

In Column 7, Line 21, in Claim 5, delete "node nodes" and insert -- nodes --, therefor.

Signed and Sealed this
Twenty-sixth Day of February, 2013

Teresa Stanek Rea
*Acting Director of the United States Patent and Trademark Office*